Jan. 15, 1935.　　　S. A. STAEGE　　　1,987,720
REGULATING SYSTEM
Filed Sept. 27, 1933　　2 Sheets-Sheet 1
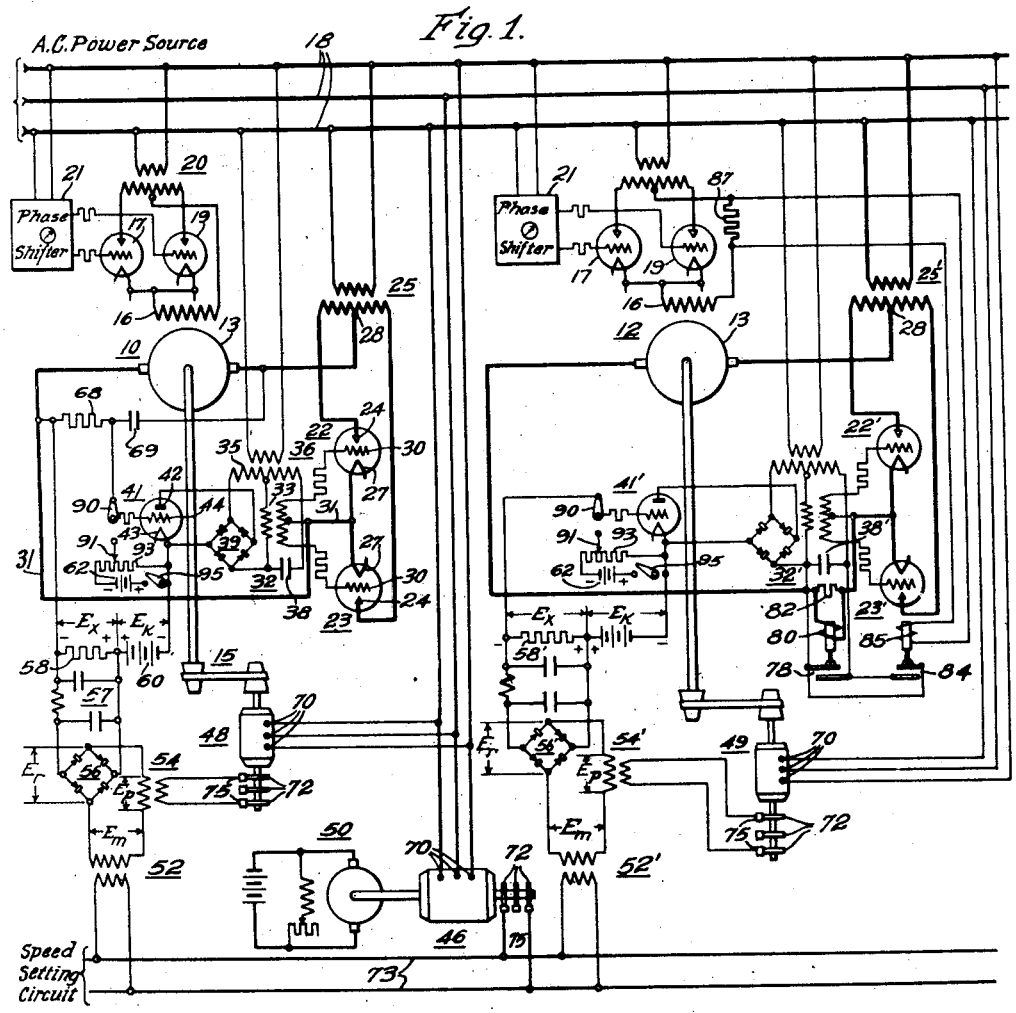
WITNESSES:
INVENTOR
Stephen A. Staege.
BY
ATTORNEY Jan. 15, 1935.  S. A. STAEGE  1,987,720

REGULATING SYSTEM

Filed Sept. 27, 1933  2 Sheets-Sheet 2

WITNESSES:
C. J. Weller.
C. F. Bryant.

INVENTOR
Stephen A. Staege.
BY Franklin E. Hardy
ATTORNEY

Patented Jan. 15, 1935

1,987,720

UNITED STATES PATENT OFFICE 1,987,720

REGULATING SYSTEM

Stephen A. Staege, Pittsburgh, Pa., assignor to Westinghouse Electric & Manufacturing Company, East Pittsburgh, Pa., a corporation of Pennsylvania Application September 27, 1933, Serial No. 691,159

5 Claims. (Cl. 172—293)

My invention relates to regulating systems, and it has particular relation to systems for maintaining the speeds of a plurality of electrical machines in a predetermined relationship.

In certain applications where a plurality of separate driving motors are utilized to propel different portions of a common equipment, such for example, as is utilized in the manufacture of paper, it is essential that the speeds of the several motors be very accurately maintained in predetermined relation. In the majority of applications of this kind direct-current motors are utilized because they are inherently capable of a very broad range of accurate speed control.

In such regulating systems a satisfactory practice is to compare the speed of each of the motors to be regulated with that of a master machine which rotates at a constant or desired rate, this comparison being made in such manner that variations from the desired speed relation will act to initiate corrective adjustments of the motor speed. My invention is directed to an improved type of speed regulating system for this and other comparable applications.

One object of my invention is to provide a speed regulating system capable of accurately maintaining the speeds of a plurality of electric motors in a given predetermined relation with respect to each other, which system is simple in construction, effective in operation, and relatively low in cost.

Another object of my invention is to provide a regulating system of the type described that is especially applicable to direct-current motors the excitation or main energization of which is supplied through controllable electronic tubes.

An additional object of my invention is to provide a system of the type described in which a master machine of the alternating-current type determines the speed of all of the regulated machines.

A further object of my invention is to provide a regulating system for the class of applications under consideration in which the use of mechanically separable contact members is eliminated and which is capable of a rapidity or quickness of response not heretofore attainable.

An additional object of my invention is to provide improved forms of stabilizing means for regulating system of the speed-matching type.

A still further object of my invention is to simplify the equipment required for energizing the direct-current motors to be controlled when the primary source of power is an alternating-current circuit.

More specifically stated, a major object of my invention is to provide a regulating system of the speed-matching type in which each of the regulated motors will rotate at a speed which at all times is in effective synchronous relation with the alternating-current speed-setting machine or master circuit.

My invention, together with additional objects and advantages, will best be understood from the following description of specific embodiments thereof, when taken in conjunction with the accompanying drawings, in which:

Figure 1 is a diagrammatic view illustrating apparatus and circuits comprised by a preferred form of the regulating system of my invention shown as being applied to control the speeds of a plurality of direct-current motors;

Fig. 2 is a diagram of voltage vectors illustrating the relation between phase displacement and summation value of two alternating-current voltages;

Fig. 3 is a simplified view of equipment for allowing the regulated motor to more readily fall into step with the master machine;

Figure 4:
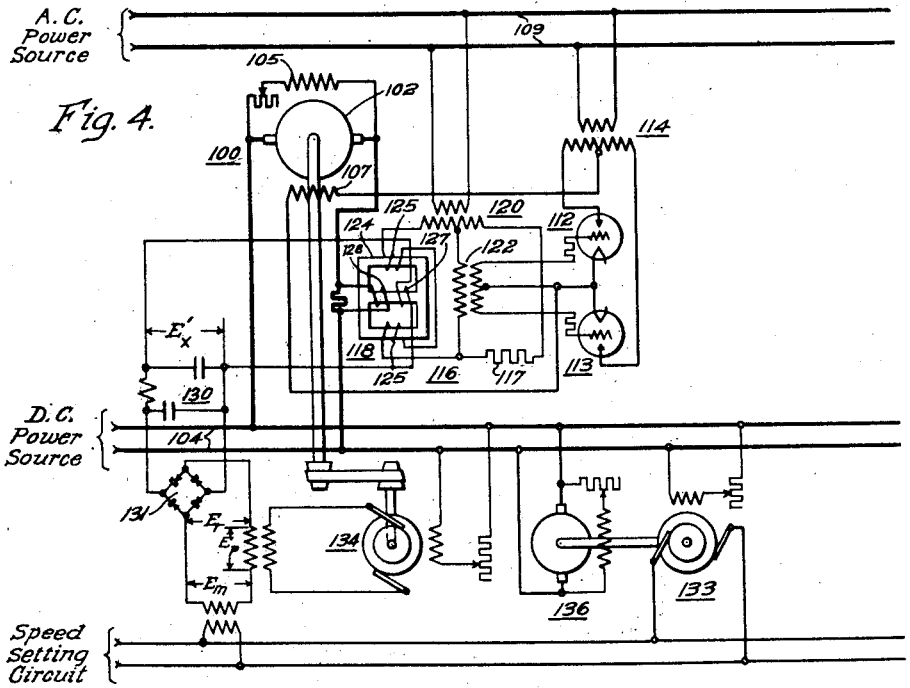
Fig. 4 is a diagrammatic view of apparatus and circuits comprised by a second embodiment of the regulating system of my invention.

Referring to the drawings, and particularly to Fig. 1 thereof, two of the plurality of direct-current motors whose speeds are to be regulated are illustrated at 10 and 12. The motors comprise armature windings 13 that are connected to receive rectified current derived from alternating-current supply conductors 18 and shunt field windings 16 that are similarly energized by rectified current derived from the same source.

The motor 10 drives, through a suitable speed-changing or adjusting mechanism illustrated at 15, a pilot generator 48 of the alternating-current type. The output voltage of this generator is compared in phase position with the output voltage of a master generator 46 which is driven at a desired rate of speed by any suitable means shown in the form of a direct-current motor 50. Regulated motor 12 similarly drives a pilot generator 49 which is also of the alternating-current type. The function of each of these pilot machines is to produce an alternating-current voltage having a frequency proportional to the speed of the associated regulated motor. If desired this voltage might instead be derived through slip-rings connected with the motor-armature winding.

In the particular arrangement illustrated in Fig. 1 the regulating means serve to effect adjustments of the armature winding current of each of the controlled motors which are excited at substantially constant magnitude during normal operation, it having been found that such an arrangement makes for more rapid response since the motor armature winding offers less inductive lag to changes in energizing current than does the motor field winding. It will be understood, however, that insofar as the operation of the regulating system of my invention is concerned, the motor armature winding could be constantly energized and the field winding current controlled by the regulating equipment.

As speed-adjusting means I utilize, in the system of my invention, electronic tubes or other equivalent devices capable of conductivity control, electronic tubes of the grid-controlled gas-filled variety being illustrated in Fig. 1. Such tubes possess the characteristic that when their anode elements are energized by an alternating-current potential, current conduction during each positive half cycle thereof can be started only when the grid voltage is of a given critical value. In tubes of this type it is found that if an alternating-current potential also be applied to the grid elements, the point during the positive half cycle of anode voltage where conduction will start may be shifted by changing the amount of phase displacement between the grid and anode voltages. When the displacement is slight conduction will be instituted at an early point in the positive half cycle, and, continuing as it does during the remainder of that half cycle, the effective current passed by the tube will be maximum. However, as the displacement of the grid voltage with respect to the tube anode voltage is made to approach 180°, the conduction starting point is progressively delayed, with a resulting decrease in effective tube conductivity, until it is completely interrupted.

To supply the desired constant energization to the motor field windings 16 from the alternating-current circuit 18 I utilize a pair of grid-controlled gas-filled tubes 17 and 19, energized in the manner shown from a transformer 20 and controlled by means of a phase-shifting device 21, the details of which, forming no part of the present invention, are not disclosed. By adjusting the phase shifter 21 it will be apparent that the magnitude of current supplied to motor field winding 16 may be adjusted to any value desired.

Intermediate the alternating-current power supply circuit 18 and the armature winding 13 of motor 10 I further dispose a pair of controllable devices, shown as electronic tubes 22 and 23 also of the grid-controlled gas-filled or other equivalent type. The anode elements 24 of these tubes are connected to the two ends of the secondary winding of a transformer 25, while the cathode elements 27 are joined together to constitute, through a conductor 31, a connection with one side of the motor armature winding 13. The other side of winding 13 is connected to a mid-tap 28 of the secondary winding of transformer 25, the primary winding of which transformer is directly connected with the alternating-current circuit 18.

Each of the two tubes 22 and 23 is capable of conducting current only from the anode to the cathode element thereof. In the particular connection shown, tube 22 thus passes current to the motor armature winding during alternate half cycles of the alternating-current voltage wave, while tube 23 similarly passes current during the remaining half cycles. The effective value of this current may be controlled, as before pointed out, by changing the character of the potential impressed upon the tube grid elements 30.

The grid-control potential for the tubes is supplied from a phase-shifting bridge circuit 32 which comprises a grid-influencing transformer 33 connected between the mid-point of the secondary winding 35 of a transformer 36 and a conductor joining a capacitor 38 with a full-wave rectifier 39. The capacitor and rectifier of the bridge circuit are connected in series for energization from the transformer 36, the primary winding of which transformer is energized from the alternating-current circuit 18.

The amount of phase-shift between the voltage of transformer 33 of the bridge circuit and the motor current supply circuit 18 is controlled by varying the effective resistance of the rectifier 39, which variation is effected by an electronic tube 41. This tube is preferably of the vacuum type having anode and cathode elements 42 and 43 connected with the output terminals of the rectifier, and a grid element 44 which is influenced by a control potential the magnitude of which is a function of the speed of the regulated motor 10.

The phase-shifting bridge circuit 32 and the control means therefor is more completely described in a copending application, Serial No. 568,537 by F. H. Gulliksen, filed October 13, 1931 and assigned to the same assignee as this invention. As is pointed out in that application, when the grid element 44 of the vacuum tube 41 is made more negative with respect to the cathode element the resulting increased impedance offered by the tube raises the effctive resistance of rectifier 39. This acts in a manner to effect an increase in the displacement angle between the voltages of transformers 33 and 36. As a result of this increased angle of displacement of the voltage impressed upon the grids 30 of the gas-filled tubes 22 and 23 with respect to the anode voltages of these tubes, the effective current passed by them is lowered. In a similar manner a change in the positive direction of the vacuum tube bias effects an increase in the current supplied from the alternating-current circuit 18 to the armature winding 13 of the regulated motor.

Consequently, in the system of Fig. 1 the energization of the armature winding 13 may be raised by changing the grid bias of tube 41 in the poitive direction and lowered by changing the bias in the negative direction. Assuming, as has been explained, that the excitation of the regulated motor is maintained constant, such armature winding current increases and decreases tend, respectively, to increase and decrease the motor speed.

In a regulating system embodying my invention the speed of each of the regulated motors 10 and 12 is, as has been pointed out, compared with the speed of a master generator 46 through the utilization of the motor-driven pilot generators 48 and 49 which are respectively driven at speeds definitely related to those of motors 10 and 12. Machines 46, 48 and 49 are illustrated in the form of induction generators which, in mechanical construction, may be similar to wound-rotor induction motors. Each of these generators thus comprises three-phase armature windings (not shown) terminating in terminals 70, and three-phase rotor windings (also not shown), the connections of which are brought out to slip rings 72. The machine stator windings are shown as being excited from the three-phase power source 18 by means of direct connections therewith.

The master generator 46 is preferably driven at a speed which is somewhat different from the synchronous speed determined by the frequency of the exciting source 18, in order that there may be impressed, through a pair of brushes 75, upon a standard or speed-setting circuit 73 an alternating-current voltage of a relatively low frequency. Likewise, when the speeds of regulated machines 10 and 12 are of the desired value, the pilot generators 48 and 49 driven thereby are rotated at speeds similarly differing from their excitation-determined synchronous values, in order that there will be induced in their rotor windings alternating-current voltages of a like low frequency. As will be more clearly seen presently, the advantage of utilizing such a low frequency is that the regulated motors will be allowed to deviate a somewhat greater amount in their angular position without pulling the pilot generators out of step with the master generator voltage acting in speed-setting circuit 73.

Through this standard speed circuit 73 the master generator 46 energizes a transformer 52, the secondary winding of which is connected in series with that of a transformer 54 which is energized from the output circuit of the pilot generator 48. The voltage $E_m$ supplied from the master generator thus adds to the voltage $E_p$ supplied from the pilot generator 48 to produce the voltage $E_r$ which is impressed upon a full-wave rectifier 56.

The output terminals of this rectifier supply, through suitable filter equipment 57, a direct-current potential $E_x$ which is impressed upon a resistor 58. As is shown by the vector diagram of Fig. 2, when the phase displacement between the voltages $E_m$ and $E_p$ is small, their sum $E_r$ is relatively large. However, as the voltage vector $E_p$ becomes further displaced from the vector $E_m$, as for example, to the position represented at $E'_p$, the sum of the two voltages is materially reduced, as shown by the vector $E'_r$. Consequently, the magnitude of the direct-current potential $E_x$ is a maximum when the voltage of pilot generator 48 is in phase with that of the master generator 46 and progressively decreases as this in-phase relation is departed from.

The grid circuit of the vacuum tube 41 is acted upon by the displacement responsive voltage $E_x$ which, in the particular connection shown, opposes a second voltage $E_k$ of substantially constant magnitude that may be supplied from any suitable direct-current source represented in the form of battery 60. For normal operating conditions of the regulating system, voltage $E_x$ is somewhat greater than opposing voltage $E_k$, and of the polarity designated, in order that the grid element 44 of vacuum tube 41 may normally be maintained at a small negative potential with respect to the cathode element 43 of the tube.

The speed-control equipment described for motor 10 is depicted for the motor 12, it comprising controllable rectifier tubes 22' and 23' connected intermediate the transformer 25', energized from circuit 18, and the armature winding of motor 12, a phase-shifting bridge circuit 32' which determines the character of tube grid-potential, a vacuum tube 41' which controls the bridge circuit, transformers 52' and 54' for coupling the pilot generator 49 with master generator 46 and a rectifier 56' which supplies resistor 58' with a voltage which is a function of the speed of motor 12.

As will become apparent, the system of my invention comprises means whereby each of the regulated motors will be caused to run at the speed which maintains its pilot generator in synchronism with the master generator, variations in the speed relation all being kept within the range of one-half cycle of master generator voltage. The regulation is, therefore, exceedingly accurate and capable of precise adjustment.

In operation of the regulating system, when the phase position of the output voltage of pilot generator 48 lags behind the output voltage of master generator 46 by a small angle, as indicated by the opening between the vectors $E_m$ and $E_p$ in Fig. 2, the sum of these two voltages or $E_r$ is of such a value that the voltage $E_x$ (Fig. 1) appearing across the resistor 58 is somewhat greater than constant voltage $E_k$ (also Fig. 1) in opposition to which it acts to supply, as before stated, a small value of negative bias to the grid element 44 of the vacuum tube 41. This particular value of grid bias acting through the bridge circuit 32 maintains the control tubes 22 and 23 in such a state of effective conductivity that the armature winding energization of the motor 10 is of the value required to produce the desired speed.

In the event of a decrease in the speed of motor 10, such as may result from an increase in the motor load or from other causes, the angle of lag between the pilot generator voltage $E_p$ and the master generator voltage $E_m$ increases. This, as reference to Fig. 2 indicates, decreases the voltages $E_r$ and $E_x$ and thereby effects a decrease in the negative bias voltage applied to the grid element of vacuum tube 41. As has been pointed out, such a change of bias in the positive direction acts to raise the conductivity of tubes 22 and 23 and, because of the resulting increase in motor armature current, causes the motor speed to be raised.

It will be understood that the amount of corrective change may be relatively small, the effect being to decrease the angle of lag of the voltage in the pilot generator. This, in turn, effects an increase in the magnitude of the voltage $E_x$ which restores the armature winding energization of the motor to a properly balanced higher value.

In a similar manner a change in motor operating conditions which tends to raise the motor speed causes the angle of lag between pilot and master generator voltages $E_p$ and $E_m$ to decrease. The resulting increase in magnitude of voltage $E_x$ raises the value of negative bias impressed upon the vacuum tube 41. This change of bias in the negative direction correspondingly lowers the armature winding energization of motor 10 and causes the motor to slow down.

By so proportioning the several elements of the control system that a change in phase displacement of the pilot and master generator voltages through an angular range of less than 180° acts to effect an adjustment of motor energization from the maximum to the minimum required values, it will be apparent that the desired synchronous operation of the motor-driven pilot generator with respect to the master generator, will, for all normal operating or load conditions of the regulated motor, be positively maintained.

In a similar manner the speed of motor 12 is maintained at a definite relation with respect to that of master generator 46. This relation may or may not, of course, be one in which the speeds of the master generator and the regulated motors are equal, since the necessary requirement that the pilot generator frequency match that of the master generator voltage may be fulfilled when the regulated motors are run at different though definitely related speeds, such difference being made possible through the utilization of the before-described speed-changing means 15.

It will likewise be apparent that a greater number of motors than the two illustrated at 10 and 12 of Fig. 1 may be controlled by the regulating system of my invention which is thus of broad applicability.

Should it be desired to raise or lower the speed of the regulated motors 10 and 12, this may readily be done by increasing or decreasing the speed at which master generator 46 is driven. When this is done the regulated equipment of my invention functions automatically to effect the necessary re-adjustments in the normal or balanced value of motor energization which are required to maintain the changed values of speed. In the system of Fig. 1 such speed adjustment is, of course, effected by appropriately varying the speed of the master generator driving motor, 50.

While the current-controlling means for the motor windings have been shown in the form of electronic tubes of the grid-controlled gas-filled type, it will be understood that other rectifying devices capable of effecting conductivity control may also be utilized, as, for example, liquid-pool cathode rectifiers provided with make-alive elements which must be excited to institute conduction during each positive half cycle of anode voltage. It will thus be understood that, my invention contemplates a broad application of the principle of utilizing the phase-displacement between a pilot and a master alternating-current voltage to regulate the speed of a rotating machine of which a direct-current motor is a typical example, and hence is not to be restricted to any particular form of speed-adjusting means applied to the machine.

In order to improve the stability of the regulating system, anti-hunting means may, if desired or found necessary, be combined therewith. In the system of Fig. 1, two preferred forms of anti-hunting means are illustrated respectively in association with motors 10 and 12. In the case of motor 10 these means comprise a resistor 68 disposed in the grid energizing circuit of vacuum tube 41 and connected in series with a capacitor 69 for energization by the voltage appearing across armature winding 13 of motor 10. This particular arrangement is comparable to that shown and described in copending application Serial No. 543,514 by J. H. Ashbaugh and F. H. Gulliksen, filed June 11, 1931 and assigned to the same assignee as this invention. As explained in that application, a change in the energization and, hence, the voltage appearing across the motor armature winding 13, causes the capacitor 69 to draw a current through resistor 68. The voltage drop set up by this current in the resistor is of such polarity that the excitation adjustment which produced it will tend to be retarded, such retardation resulting from a modification of the grid bias of vacuum tube 41. The magnitude of this modification, furthermore, is directly dependent upon the rate of change of motor energization adjustment.

The anti-hunting means illustrated in association with motor 12 of Fig. 1 comprise an auxiliary capacitor 78 which is connected in parallel with the capacitor 38' which forms a part of the phase-shifting bridge circuit 32'. The capacitor 78 is of a variable type arranged for control by a solenoid device 80 which is energized in accordance with the current supplied to the armature winding of the regulated motor 12, such energization being derived from the potential appearing across a resistor 82 connected in series with this winding.

Changes in the motor armature current thus cause corresponding changes in the capacity of device 78 which serves to recalibrate the phase-shifting bridge circuit 32' in such manner that the conductivity of tubes 22' and 23' is modified in a stability producing manner.

Should it be desired to make the anti-hunting means also responsive to changes in the field winding current of the regulated motor 12, this may be done by providing an additional auxiliary capacitor element 84, the adjustment of which is effected by a solenoid device 85. This solenoid is energized by a portion of the current supplied to the field winding of the motor 12 through a resistor 87. It will be understood that the field winding responsive anti-hunting means may not only be used in combination with the armature winding responsive means, but, in certain cases, particularly when the regulating system acts to change the motor excitation instead of the armature winding current, may be used separately or alone.

To facilitate the starting up of the regulated motors in a manner to permit of speed adjustment closely approximating the desired or effective synchronous value before placing the motors in control of the automatic regulating equipment just described, I provide means whereby the grid bias applied to the bridge control tubes 41 and 41' may be manually adjusted. In the system of Fig 1 such means are shown in the form of a single-pole double-throw switch comprising a blade 90 which, when thrown to the upward position illustrated, connects the tube grid circuit with the automatically controlled potential supply, and when thrown downwardly connects the tube grid circuit with a manually adjustable source of supply comprising a tap connection 91 which may be moved along a potentiometer resistor 93 to determine the amount of bias applied to grid element 44. When so used, a second switch 95 should be closed to connect the resistor across an auxiliary battery 62 from which the control voltage is supplied during the starting period.

If the tap connection 91 is moved along the resistor 93, the value of tube grid bias may be changed in such direction as to gradually increase the conductivity of rectifier tubes 22 and 23 and effect an increasing energization of the motor armature winding. When the motor speed has attained the value closely approaching that for which the regulating system is set, switch blade 90 may be closed to the upward position illustrated in which automatic speed control of the motor will be effected. As has been pointed out, this automatic control is such that the pilot generator voltage will be maintained in synchronous relation with the master generator voltage.

To more readily enable the regulated motor to fall into step with the master generator 46 during such starting operations, it may be desirable to insert between the motor and the mechanical load which it drives, particularly if this load possesses a high value of inertia, a flexible coupling device. Such a device, which is schematically indicated in Fig. 3 at 98, allows the rotor of the motor to advance forward at a faster rate than does the driven load, which under the influence of the energy stored in the device 98, soon advances to the normal position with respect to the motor shaft. It will be understood that the expedient illustrated in Fig. 3 is required only in unusual cases where the inertia of the driven load is especially high or where the frequency of the master generator is so high as to allow but a relatively short time for the synchronizing or pulling into step of the regulated machine.

The embodiment of my invention illustrated in Fig. 1 requires the use of a vacuum tube (41) in association with the phase-shifting bridge circuit which utilizes a series connection of a capacitor and an adjustable resistor. In practicing my invention other forms of phase-shifting bridge circuits may also be utilized as shown in Fig. 4. In Fig. 4, the motor to be regulated is illustrated at 100 as being of the direct-current type comprising an armature winding 102 which derives its energy directly from a source of direct-current power illustrated in the form of circuit conductors 104. The motor is provided with a field winding 105 also energized from source 104 which supplies a major portion of the required excitation and a second field winding 107 which supplies the portion of excitation necessary to effect the desired speed regulation.

Regulating winding 107 derives its energy from a source of alternating-current power, designated by circuit conductors 109, through a pair of grid-controlled gas-filled rectifier tubes 112 and 113 which are disposed intermediate the winding and a supply transformer 114. This supply and control circuit is identical with that already described in connection with the armature windings of the regulated motors shown in Fig. 1, the conductivity of tubes 112 and 113 being determined by the phase relation of the potential supplied to the grid elements with respect to the power voltage acting in the anode element circuits.

This grid-control potential is supplied through the medium of a phase-shifting bridge circuit 116 which comprises a series connection of a resistor 117 and a saturable core reactor 118 which connection is energized from the secondary winding of a transformer 120, the primary winding of which is connected with the power circuit 109. Between the mid-point of the secondary winding of the transformer and the common connection of the reactor and resistor is connected a transformer 122 which supplies control voltages to the grid elements of tubes 112 and 113, the phase position of which with respect to the voltage of source 109 may be adjusted by changing the effective reactance of device 118.

Device 118 comprises a multi-leg magnetic core structure 124 upon the two outer legs of which are carried reactive impedor windings 125 and on the central or saturating leg of which is carried a major exciting or saturation control winding 127 and a second saturating or stabilizing winding 128. Winding 127 derives its energization through suitable filtering equipment 130 from a rectifier 131, which, as in the system of Fig. 1, is energized by a voltage $E_r$ made up of two components $E_m$ and $E_p$, respectively produced by a master generator 133 and a pilot generator 134.

Generators 133 and 134 are shown as the direct-current excited synchronous type instead of the frequency-changing or rotor-wound induction motor type shown and described in connection with Fig. 1, which type of machine might also be used in the regulating system of Fig. 4. The pilot generator 134 is driven through suitable speed changing or adjusting means by the regulated motor 100 at a speed definitely related to the motor speed, while the master generator 133 is driven at a constant speed by any suitable means shown in the form of a direct-current motor 136. Likewise, as in the system of Fig. 1, the regulating equipment of Fig. 4 is disposed to maintain the speed of motor 100 such that the voltage of pilot generator 134 will be maintained in synchronous relation with respect to the voltage of master generator 133.

In operation of the system of Fig. 4 a decrease below the desired value of speed of motor 100 increases the lag of pilot generator voltage $E_p$ with respect to the master generator voltage $E_m$, causing the voltage $E'_x$ impressed upon control winding 127 of reactor 118 to be lowered. This decreases the saturation of the reactor core and raises the reactance presented by windings 125 to the flow of current from transformer 120. The amount of phase displacement of the grid voltage supplied through transformer 122 to tubes 112 and 113 is accordingly increased, with the result that the conductivity of the tubes is lowered. Such lowering of conductivity decreases the exciting current supplied to motor field winding 107 and causes the motor to appropriately increase its speed.

In a similar manner in the event that the motor speed rises above the desired value the pilot generator voltage $E_p$ more nearly approaches the master generator voltage $E_m$ with the result that potential $E'_x$ is raised and the saturation of reactor 118 is increased. The resulting reduction in reactance of windings 125 lowers the phase displacement of the voltage supplied to the grid elements of rectifier tubes 112 and 113 with the result that the tubes become more conductive and supply a greater current to motor field winding 107. This increased excitation acts to appropriately reduce the speed of motor 100.

To prevent over-shooting of the corrective actions just described the stabilizing winding 128 of reactor 118 is connected in the manner shown to receive an energization which is dependent upon the magnitude of current flowing through the armature winding 102 of the regulated motor. Corrective changes in motor excitation cause corresponding fluctuations in armature current, which, through the medium of winding 128, are caused to prematurely arrest the corrective excitation changes in a manner that over-shooting of the speed adjustments is effectively prevented.

The two embodiments of my invention thus far described have both required the use of a phase-shifting bridge circuit and in association with the speed control rectifier tubes, which bridge circuits are controllable by a direct-current potential derived from the summation voltages of the pilot and master generators. In made of such capacity as to supply the regulating energization to the motor, this intermediate phase-shifting bridge circuit may be eliminated as in the system shown in Fig. 5.

Figure 5:
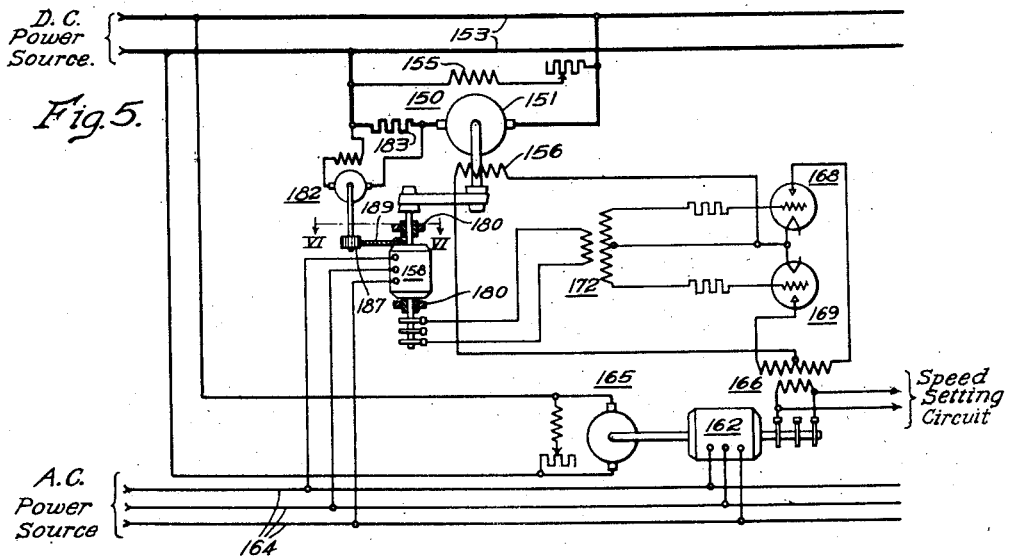
Fig. 5 is a similar diagrammatic representation of a third embodiment of my invention applied to a speed-matching regulating application; and, Fig. 6 is a sectional view taken on line VI—VI of Fig. 5 showing the construction of the anti-hunting means which forms a part of the complete system of Fig. 5.

In Fig. 5 the motor to be regulated is illustrated at 150 as comprising an armature winding 151 directly energized from a direct-current source of power 153, a main field winding 155 similarly energized, and a regulating field winding 156.

The motor drives a pilot generator 158 at a speed definitely related to the motor speed, which pilot generator cooperates with a master generator 162 suitably driven by a motor 165.

The pilot and master generators are illustrated in the form of frequency-changing devices of the same type as described in connection with Fig. 1. These two machines derive their excitation from a source of alternating-current power represented by circuit conductors 164. Master generator 162 is of sufficient capacity to supply, through the transformer 166 and controllable rectifier tubes 168 and 169, the energization for regulating field winding 156, the supply circuits utilized being the same as those already described.

Rectifier tubes 168 and 169 lend themselves to the usual conductivity control through the shifting of the phase-position of the potentials applied to their grid elements with respect to their anode potentials. Whereas, in the systems heretofore described, a special phase-shifting bridge circuit has been required, in the system shown in Fig. 5 the pilot generator 158 directly energizes the grid-potential supply transformer 172 and thereby effects a considerable simplification in the required equipment.

When the output voltage of pilot generator 158 is in phase with the output voltage of master generator 162 the grid control potentials applied to rectifier tubes 168 and 169 will have a similar in-phase relation to the tube anode potentials and the tubes will be operating under their maximum conductivity condition, as heretofore explained. However, as the output voltage of pilot generator 158 deviates in phase position from that of master generator 162 the grid control voltages supplied through the transformer 172 will similarly deviate from the anode voltages of the rectifier tubes, with the result that the conductivity of these tubes will progressively decrease as the displacement angle approaches 180°, as was also previously explained.

Consequently, in operation of the regulating system of Fig. 5 as the speed of regulated motor 150 drops below the desired value, the output voltage of pilot generator 158 driven thereby will lag the voltage of master generator by a greater amount, and thereby cause the conductivity of excitation supply tubes 168 and 169 to decrease. The resulting reduction in motor excitation causes the motor to appropriately speed up.

In a similar manner when the motor speed exceeds the desired value, the voltage of pilot generator 158 will approach in phase position that of master generator 162 with the result that the conductivity of excitation supply tubes 168 and 169 will then be raised. The resulting increase in motor excitation will appropriately lower the motor speed.

Figure 6:
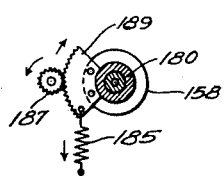

In order to prevent over-shooting of the corrective action I provide in connection with the system of Fig. 5, means whereby changes in the armature winding current of the regulated motor will act to shift the position of the stator element of pilot generator 158 with respect to the motor driven rotor element. In order that this shift may be effected, I mount the frame of the pilot generator 158 in suitable bearing members 180 in which it may be permitted to turn when the torque of a series motor 182, energized by the voltage appearing across a resistor 183, connected in series with the armature winding 151 of regulated motor 150, exceeds the restraining action of a tension spring 185 (Fig. 6). The motor 182 drives a pinion 187 which cooperates with a toothed projection or gear section 189 directly attached to the frame of pilot generator 158. The relation of these parts is most clearly illustrated in Fig. 6.

Corrective changes in the speed of regulated motor 150 result, as already explained, in corresponding changes in the armature winding current of the motor. These changes thus appear as variations in the torque exerted by series motor 182 which, in turn, determine the rotational position of the stator or frame member of the pilot generator 158. Such changes in rotational position take place in a direction to arrest the corrective action or restore to the original positions the phase displacement between the voltages acting in transformers 166 and 172. By virtue of such restoration, over-shooting of the corrective actions is effectively prevented.

It will be seen that in each of the three embodiments of my invention respectively illustrated in Figs. 1, 4 and 5, the regulated motor is caused to rotate at a speed which will maintain the motor-speed-responsive voltage in synchronous relation with respect to the voltage of a master or speed-setting generator or circuit. This characteristic is found to be of great value in the solution of regulating problems of the speed-matching variety.

Although I have shown and described certain specific embodiments of my invention, I am fully aware that many modifications thereof are possible. My invention, therefore, is not to be restricted except insofar as is necessitated by the prior art and by the scope of the appended claims.

I claim as my invention:

1. A speed-regulating system for a direct-current motor having field and armature windings comprising in combination, means including an electronic tube of the grid-controlled type for adjusting the current in one of said windings, means, including a phase-shifting bridge circuit, for impressing upon said tube a control potential of adjustable phase position, a master circuit having acting therein an alternating-current voltage of a given frequency, means for producing an alternating-current voltage having a frequency proportional to the speed of the motor, means for combining said voltage with that of the master circuit in a manner that the resultant summation potential varies with the phase displacement between the said two component voltages, and means for controllably impressing said summation potential upon said phase-shifting bridge circuit.

2. A speed-regulating system for a direct-current motor having field and armature windings comprising in combination, a source of alternating-current power for energizing one of said windings, current-rectifying and adjusting means, comprising a grid-controlled electronic tube, disposed intermediate the power source and the winding, means including a phase-shifting bridge circuit, for impressing upon said tube a control potential having a phase position which is adjustable with respect to the power source voltage, a master circuit having acting therein an alternating-current voltage, means for producing a pilot voltage of a frequency proportional to the speed of the motor, means for so combining said pilot and master-circuit voltage that the resulting summation potential varies with their phase displacement, and means for controllably impressing said summation potential upon said phase-shifting bridge circuit.

3. In a speed-regulating system, for a direct-current motor having field and armature windings, comprising an electronic tube for adjusting the current in one of said windings, a phase-shifting bridge circuit, comprising a pair of series-connected impedor elements, for supplying to said tube a control potential, and means for adjusting the impedance of one of said elements in accordance with the deviations from a desired value in the speed of the motor, the combination of means for stabilizing the corrective actions effected by said system comprising means for varying the impedance of one of the said bridge-circuit impedor elements in accordance with changes in the current acting in one of said motor windings.

4. In a speed-regulating system for a direct-current motor having field and armature windings, the combination of an electronic tube for adjusting the current in one of said windings, a phase-shifting bridge circuit, comprising a capacitor connected in series with a resistor, for supplying to said tube a control potential, means for adjusting the resistance of said resistor in accordance with deviations from a desired value in the speed of the motor, and means for stabilizing the corrective actions effected by said system comprising an auxiliary capacitor also connected in the bridge circuit, and means for varying the capacitance of said auxiliary capacitor in accordance with changes in the current acting in one of said motor windings.

5. In a speed-regualting system for a direct-current motor having field and armature windings, the combination of an electronic tube for adjusting the current in one of said windings, a phase-shifting bridge circuit, comprising a reactor connected in series with a resistor, for supplying to said tube a control potential, means for adjusting the reactance of said reactor in accordance with deviations from a desired value in the speed of the motor, and means for stabilizing the corrective actions effected by said system comprising means for varying the reactance of said reactor in accordance with changes in the current acting in one of said motor windings.

STEPHEN A. STAEGE.